United States Patent

Po' et al.

[11] Patent Number: 5,830,959
[45] Date of Patent: Nov. 3, 1998

[54] PROCESS FOR THE PRODUCTION OF VINYLAROMATIC POLYMERS WITH A HIGH DEGREE OF SYNDIOTACTICITY

[75] Inventors: Riccardo Po', Leghorn; Nicoletta Cardi; Roberto Santi, both of Novara, all of Italy

[73] Assignee: Enichem S.p.A., Milan, Italy

[21] Appl. No.: 944,783

[22] Filed: Oct. 6, 1997

[30] Foreign Application Priority Data

Oct. 24, 1996 [IT] Italy .................. MI 96 A 002203

[51] Int. Cl.$^6$ .............. C08F 4/646; C08F 12/02
[52] U.S. Cl. .............. 526/150; 526/153; 526/160; 526/347.2; 502/103; 502/107; 502/131; 502/132; 502/153
[58] Field of Search .................. 526/150, 159, 526/160, 166, 153; 502/131, 153, 103, 132, 107

[56] References Cited

U.S. PATENT DOCUMENTS

| | | | |
|---|---|---|---|
| 4,978,730 | 12/1990 | Maezawa et al. | 526/160 X |
| 5,023,304 | 6/1991 | Takeuchi et al. | 526/160 |
| 5,084,585 | 1/1992 | Maezawa et al. | 526/160 X |
| 5,326,837 | 7/1994 | Kissin | 526/150 |
| 5,728,784 | 3/1998 | Po' et al. | 526/150 X |

FOREIGN PATENT DOCUMENTS 0 780 405  6/1997  European Pat. Off. .

*Primary Examiner*—Fred Teskin
*Attorney, Agent, or Firm*—Oblon, Spivak, McClelland, Maier & Neustadt, P.C.

[57] ABSTRACT

Process for the preparation of crystalline vinylaromatic polymers with a high degree of syndiotacticity which comprises polymerizing vinylaromatic monomers in the presence of a catalytic system essentially consisting of:

a) a complex of titanium selected from those having the general formula:

$$(CpR_1R_2R_3R_4R_5)TiX_3 \qquad (I)$$

wherein the groups $R_1$, $R_2$, $R_3$, $R_4$ and $R_5$ represent a hydrogen atom or $C_1$–$C_{10}$ alkyl groups;

X represents a hydrogen atom, a halogen such as chlorine, a $C_1$–$C_{10}$ alkyl or oxyalkyl radical or a $C_6$–$C_{12}$ oxyaryl radical;

b) an alkylaluminoxane; and c) an organic derivative of tin;

characterized in that the alkylaluminoxane is methylaluminoxane (MAO) treated at 20°–80° C. under vacuum for 1–100 hours and the organic derivative of tin is tin tetraphenyl.

12 Claims, No Drawings

PROCESS FOR THE PRODUCTION OF VINYLAROMATIC POLYMERS WITH A HIGH DEGREE OF SYNDIOTACTICITY

The present invention relates to a process for the preparation of vinylaromatic polymers with a high degree of syndiotacticity.

More specifically, the present invention relates to a process for the preparation of crystalline polystyrene in which the polymeric chains have an essentially syndiotactic configuration and the catalyst suitable for the purpose.

Polystyrene is a thermoplastic polymer obtained by the radicalic polymerization of styrene and is used in the production of moulded articles, films, electrical materials, materials for packaging, etc. It is an atactic, amorphous polymer with excellent insulating properties and reasonable thermal resistance. For numerous applications it is preferable however to use crystalline materials with a high thermal resistance and resistance to solvents, characteristics which atactic polystyrene does not have.

European patent 210.615 describes a polystyrene having a structure characterized by an extremely high degree of stereoregularity, in which the phenyl substituents are so arranged as to provide a syndiotactic polymer. This material does not have the above disadvantages of atactic polystyrene as it is crystalline and therefore, once transformed, can be subjected to orientation processes, it is almost completely insoluble in organic solvents and has a melting point within the range of 260–280° C., giving it a high thermal resistance, comparable to or higher than that of condensation thermoplastic polymers (polyesters, polyamides, polyimides, etc.).

Syndiotactic polystyrene can be prepared according to what is described in literature, for example in European patent EP 272.584 or in U.S. Pat. No. 4,978,730, by polymerization catalyzed by compounds of Ti or Zr, in the presence of a cocatalyst represented by methylaluminoxane (a mixture of cyclic and linear oligomers containing the repetitive unit —AlCH$_3$O—) or, as described in published European patent application 421.659, from derivatives of boron containing fluorinated groups.

Examples of catalysts for the synthesis of syndiotactic polystyrene provided in literature are titanium halides (chloride, bromide, etc.), titanium alcoholates (methoxide, ethoxide, propoxide, isopropoxide, butoxide, etc.), titanium carboxylates, metallocenes (cyclopentadienyl titanium trichloride, cyclopentadienyl titanium dichloride, pentamethylcyclopentadienyl titanium trichloride, cyclopentadienyl titanium alkoxides, cyclopentadienyl titanium alkyls, pentamethylclopentadienyl titanium alkyls, dicyclopentadienyl titanium dichloride, dicyclopentadienyl titanium alkoxides, etc.), titanium alkyls (titanium tetrabenzyl, titanium tetramethyl, titanium tetraethyl, etc.) and the corresponding zirconium compounds.

The Applicant has now found that it is possible to synthesize crystalline vinylaromatic polymers, and in particular crystalline polystyrene, having a highly syndiotactic configuration using a new catalytic system which has never been described in literature.

The present invention therefore relates to a process for the preparation of crystalline vinylaromatic polymers with a high degree of syndiotacticity which comprises polymerizing vinylaromatic monomers, either alone or mixed with at least one other ethylenically unsaturated copolymerizable monomer, in the presence of a catalytic system essentially consisting of:

a) a titanium complex having general formula:

$$(CpR_1R_2R_3R_4R_5)TiX_3 \quad (I)$$

wherein the groups $R_1$, $R_2$, $R_3$, $R_4$ and $R_5$, the same or different, represent a hydrogen atom or $C_1$–$C_{10}$ alkyl groups;

Cp is a cyclopentadienyl group;

X represents a hydrogen atom, a halogen such as chlorine, a $C_1$–$C_{10}$ alkyl or oxyalkyl radical or a $C_6$–$C_{12}$ oxyaryl radical;

b) an alkylaluminoxane; and c) an organic derivative of tin;

characterized in that the alkylaluminoxane is methylaluminoxane (MAO) treated at 20°–80° C. under vacuum for 1–100 hours and the organic derivative of tin is tin tetraphenyl.

With respect to the traditional catalytic systems, essentially based on compounds (a) and (b), the catalytic system of the present invention proves to be very active. Activities of over 1,000 Kg of polymer per grammoatom of titanium, for example of up to 4,000 Kg, as well as a high degree of syndiotacticity, can be easily obtained.

The compounds having general formula (I) are products which are known in literature and described in "Progress in Polymer Science" vol. 21, page 47, 1996.

Typical examples of complexes of titanium having formula (I) which are particularly suitable for the present invention are CpTiCl$_3$; CpTi(OCH$_3$)$_3$; CpTi(OC$_2$H$_5$)$_3$; CpTi(OC$_3$H$_7$)$_3$; CpTi(Oi-C$_3$H$_7$)$_3$; CpTi(OC$_4$H$_9$)$_3$; [Cp(CH$_3$)$_5$]TiCl$_3$; [Cp(CH$_3$)$_5$]TiBr$_3$; [Cp(CH$_3$)$_5$]TiF$_3$; CpTi(OC$_5$H$_6$)$_3$; [Cp(CH$_3$)$_5$]Ti(OCH$_3$)$_3$; [Cp(CH$_3$)$_5$]Ti(OC$_2$H$_5$)$_3$; [Cp(CH$_3$)$_5$]Ti(OC$_3$H$_7$)$_3$; [Cp(CH$_3$)$_5$]Ti(OC$_4$H$_9$)$_3$; [Cp(CH$_3$)$_5$]Ti(OC$_5$H$_6$)$_3$; CpTiH$_3$; CpTi(CH$_3$)$_3$; CpTi(C$_2$H$_5$); CpTi(CH$_2$C$_5$H$_6$)$_3$; [Cp(CH$_3$)$_5$]TiH$_3$; [Cp(CH$_3$)$_5$]Ti(CH$_3$)$_3$; [Cp(CH$_3$)$_5$]Ti (C$_2$H$_5$)$_3$; [Cp(CH$_3$)$_5$]Ti(CH$_2$C$_5$H$_6$)$_3$; CpTi(OPh)$_3$; [Cp(CH$_3$)$_5$]Ti(OPh)$_3$. Particularly preferred are the complexes in which the cyclopentadienyl group is pentamethyl substituted.

The compounds of titanium having general formula (I) are added to the polymerization mixture in such a quantity that the molar ratio vinylaromatic monomer/Ti is between 10,000 and 1,000,000, preferably between 100,000 and 500,000.

The alkylalumoxane (cocatalyst) essentially consists of mixtures of products having a linear or cyclic or caged structure. In the first case the structure is represented by the general formula (II):

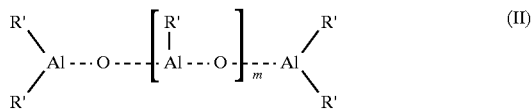

whereas in the second case by the general formula (III):

wherein m represents an integer between 1 and 40 and R' a methyl. The caged structure is described in Molecular Symposium, Vol. 97, 1995.

Alkylaluminoxanes are known in literature and described, for example, in published European patent applications 272.584 and 421.659 or in U.S. Pat. No. 4,978,730.

The cocatalyst is treated at a temperature of between 20° and 80° C. under vacuum for at least one hour and can then be added to the polymerization mixture as such or in the form of a solution in a suitable solvent, for example toluene.

The cocatalyst is generally used in such quantities that the molar ratio aluminum/Ti is between 50 and 5,000.

Tin tetraphenyl is a commercial product and is used in such a quantity that the molar ratio Sn/Ti is between 0.1 and 100, preferably below 20.

According to the process of the present invention, the catalytic system described above can also comprise, optionally, an aluminium alkyl in which the alkyl group contains from 1 to 6 carbon atoms, for example aluminium trimethyl, aluminium triethyl, aluminium triisobutyl etc. in such a way that a part of the MAO can be substituted, corresponding to a percentage varying from 0 to 75% in moles.

The term "vinylaromatic polymers" as used in the present invention and claims basically refers to polymers of styrene and derivatives of styrene and the relative copolymers containing up to 20% in moles of another copolymerizable monomer selected from those having general formula (IV):

$$CH_2=CH-R'' \qquad (IV)$$

wherein R'' represents a hydrogen atom or a $C_1-C_6$ alkyl radical or a $C_4-C_{12}$ cycloalkyl radical.

Derivatives of styrene comprise alkyl styrenes, in which the alkyl group contains from 1 to 4 carbon atoms, halogenated styrenes, $C_1-C_4$ alkoxy styrenes, carboxy styrenes, vinylnaphthalenes such as alpha- or beta-vinyl naphthalene, vinyl tetrahydro naphthalene such as 1,2,3,4-tetrahydro-6-vinylnaphthalene, etc. Typical examples of substituted styrenes are p-methylstyrene, m-methylstyrene, alone or mixed with each other, ethylstyrene, butylstyrene, p-terbutylstyrene, dimethylstyrene, chlorostyrene, bromostyrene, fluorostyrene, chloromethylstyrene, methoxystyrene, acetoxy methylstyrene, etc.

The polymerization reaction can be carried out in mass or in solvent. In the latter case, the solvent can consist of aliphatic or aromatic hydrocarbons or their mixtures and is used in such quantities that the ratio by volume solvent/monomers is between 0 and 10. The preferred solvent is toluene.

More specifically, according to the general procedure adopted for this type of reaction, the vinylaromatic monomers are subjected before polymerization to specific treatment to eliminate catalytic poisons, such as phenol stabilizers, water, phenylacetylene, and consisting in distillation, passage on columns containing activated molecular sieves or activated alumina, etc. The monomers and, optionally, the solvent are charged into the reaction equipment together with the possible aluminium alkyl and cocatalyst. After a time varying from 5 seconds to 30 minutes, the catalytic system comprising the titanium complex having general formual (I) and the tin tetraphenyl is added, preferably in the form of a solution. The reaction proceeds for times varying from 15 minutes to 10 hours at temperatures of between 20° and 100° C. At the end, the polymer obtained is recovered using the traditional methods.

The following illustrative but non-limiting examples are provided to give a better understanding of the present invention and for its embodiment.

Analysis procedure:

The percentage of syndiotactic polymer is determined by extracting the polymer with acetone or methylethylketone (MEK) at boiling point for 10–20 hours.

The degree of stereoregularity is determined by nuclear magnetic resonance spectroscopy of carbon 13 as described in U.S. Pat. No. 4,680,353.

EXAMPLE 1

500 ml of a commercial solution of methylaluminoxane at 10% in toluene (Witco GmbH) were charged into a jacketed reactor placed in an inert atmosphere. The solvent was removed by distillation under vacuum at 5 torr and 55° C., after which the application of the vacuum at a temperature of 55° C. was maintained for a further 1.5 hours. At the end, the white powder obtained was transferred to a container in an inert atmosphere and used for the subsequent tests, after dissolution in toluene.

Comparative Example 1

This example describes the polymerization of styrene without tin tetraphenyl.

20 ml of styrene (0.175 moles) purified by passage on a column of basic alumina, 0.42 ml of a 1.66M solution of MAO (treated as described in example 1) in toluene (6.97× $10^{-4}$ moles) and 0.30 ml of an 0.00383M solution of $[Cp(CH_3)_5]Ti(OPh)_3$ in toluene (1.15×$10^{-6}$ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

404 mg (2.2%) of polymeric product were obtained, which were not further characterized.

Comparative Example 2

This example describes the polymerization of styrene without tin tetraphenyl.

20 ml of styrene (0.175 moles) purified by passage on a column of basic alumina, 0.62 ml of a 1.66M solution of MAO (treated as described in example 1) in toluene (1.03× $10^{-3}$ moles) and 0.30 ml of an 0.00383M solution of $[Cp(CH_3)_5]Ti(OPh)_3$ in toluene (1.15×$10^{-6}$ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

447 mg (2.6%) of polymeric product were obtained, which were not further characterized.

Comparative Example 3

This example describes the polymerization of styrene with non-treated methylaluminoxane.

20 ml of styrene (0.175 moles) purified by passage on a column of basic alumina, 0.33 ml of a 1.57M commercial solution of MAO in toluene (5.18×$10^{-4}$ moles) and 0.54 ml of an 0.00326M solution of $[Cp(CH_3)_5]Ti(OPh)_3$ in toluene (1.75×$10^{-6}$ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

935 mg of polymeric product were obtained. 876 mg of polymer were extracted with methylethylketone at boiling point for 8 hours, producing 133 mg of syndiotactic polystyrene (insoluble fraction 15.2%, yield of syndiotactic polystyrene: 0.8%).

Comparative Example 4

This example describes the polymerization of styrene in the presence of tin tetramethyl.

15 ml of styrene (0.131 moles) purified by passage on a column of basic alumina, 0.49 ml of a 1.62M solution of MAO (treated as described in example 1) in toluene (7.86× $10^{-4}$ moles), 0.53 ml of an 0.00992M solution of tin tetramethyl in toluene (5.24×10⁻⁶ moles) and 0.47 ml of an 0.00281M solution of [Cp(CH₃)₅]Ti(OPh)₃ in toluene (1.31×10⁻⁶ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

466 mg (3.4%) of polymeric product were obtained, which were not further characterized.

EXAMPLE 2

20 ml of styrene (0.175 moles) purified by passage on a column of basic alumina, 0.65 ml of a 1.62M solution of MAO (treated as described in example 1) in toluene (6.97× 10⁻⁴ moles), 4 mg of tin tetraphenyl (9.3×10⁻⁶ moles) and 0.62 ml of an 0.00281M solution of [Cp(CH₃)₅]Ti(OPh)₃ in toluene (1.75×10⁻⁶ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

9.853 g of polymeric product were obtained. 2.675 g of polymer were extracted with methylethylketone at boiling point for 8 hours, producing 2.359 g of syndiotactic polystyrene (insoluble fraction 88.2%, yield of syndiotactic polystyrene: 47.8%).

EXAMPLE 3

20 ml of styrene (0.175 moles) purified by passage on a column of basic alumina, 0.43 ml of a 1.62M solution of MAO (treated as described in example 1) in toluene (6.97× 10⁻⁴ moles), 0.58 ml of an 0.01M solution of tin tetraphenyl in toluene (5.83×10⁻⁶ moles) and 0.42 ml of an 0.00281M solution of [Cp(CH₃)₅]Ti(OPh)₃ in toluene (1.75×10⁻⁶ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

7.203 g of polymeric product were obtained. 2.459 g of polymer were extracted with methylethylketone at boiling point for 8 hours, producing 2.261 g of syndiotactic polystyrene (insoluble fraction 91.9%, yield of syndiotactic polystyrene: 36.4%).

EXAMPLE 4

20 ml of styrene (0.175 moles) purified by passage on a column of basic alumina, 0.65 ml of a 1.62M solution of MAO (treated as described in example 1) in toluene (1.05× 10⁻³ moles), 0.44 ml of an 0.01M solution of tin tetraphenyl in toluene (4.4×10⁻⁶ moles) and 0.31 ml of an 0.00281M solution of [Cp(CH₃)₅]Ti(OPh)₃ in toluene (8.75×10⁻⁷ moles) were charged in an inert atmosphere into a tailed test-tube.

The reaction was carried out for 2 hours at 90° C. At the end, the mixture was suspended in 200 ml of methanol acidified with 0.5 ml of concentrated HCl.

7.064 g of polymeric product were obtained. 4.127 g of polymer were extracted with methylethylketone at boiling point for 8 hours, producing 3.823 g of syndiotactic polystyrene (insoluble fraction 92.6%, yield of syndiotactic polystyrene: 36%).

Table 1 indicates the activities of the catalysts used in the previous examples.

TABLE 1

| Example | Molar ratios Styrene/Al/Ti/Sn | Activity (Kg/moles Ti) | Syndiotacticity (%) |
|---------|-------------------------------|------------------------|---------------------|
| 2 | 100,000:600:1:5 | 4960 | >99.5 |
| 3 | 150,000:600:1:5 | 5660 | >99.5 |
| 4 | 200,000:1200:1:5 | 7480 | >99.5 |
| comp. 1 | 150,000:600:1:0 | <350 | — |
| comp. 2 | 150,000:900:1:0 | <390 | — |
| comp. 3 | 100,000:300:1:0 | 80 | >99.5 |
| comp. 4 | 100,000:600:1:4 | <360 | — |

We claim:

1. A process for the preparation of crystalline vinylaromatic polymers with a high degree of syndiotacticity which comprises polymerizing vinylaromatic monomers, alone or mixed with at least one other copolymerizable, ethylenically unsaturated monomer, in the presence of a catalytic system essentially consisting of:

a) a complex of titanium selected from those having the formula:

$$(CpR_1R_2R_3R_4R_5)TiX_3 \qquad (I)$$

wherein the groups $R_1$, $R_2$, $R_3$, $R_4$ and $R_5$ represent a hydrogen atom or $C_1$–$C_{10}$ alkyl groups;
Cp is a cyclopentadienyl group;
X represents a hydrogen atom, a halogen, a $C_5$–$C_{10}$alkyl or oxyalkyl radical or a $C_6$–$C_{12}$ oxyaryl radical;

b) an alkylaluminoxane; and
c) an organic derivative of tin;

characterized in that the alkylaluminoxane is methylaluminoxane treated at 20°–80° C. under vacuum for 1–100 hours and the organic derivative of tin is tin tetraphenyl.

2. The process according to claim 1, wherein the molar ratio vinylaromatic monomer/Ti is between 10,000 and 1,000,000.

3. The process according to claim 1, wherein the cocatalyst is used is such quantities that the molar ratio aluminium/titanium is between 50 and 5,000.

4. The process according to claim 1, wherein the derivative of tin is added to the polymerization mixture in such a quantity that the molar ratio Sn/Ti is between 0.01 and 100.

5. The process according to claim 1, wherein the catalytic system comprises an aluminum alkyl in which the alkyl group contains from 1 to 6 carbon atoms.

6. The process according to claim 5, wherein the aluminum alkyl substitutes a part of methylaluminoxane corresponding to a percentage varying from 0 to 75% in moles.

7. The process according to claim 1, wherein the polymerization reaction is carried out in mass or in solvent.

8. The process according to claim 7, wherein the solvent is used in such quantities that the ratio by volume solvent/monomers is between 0 and 10.

9. The process according to claim 1, wherein the polymerization is carried out at temperatures of between 20° and 100° C.

10. The process of claim 1, wherein X is a halogen.

11. A catalytic composition comprising:

a) a titanium complex selected from those having formula:

$$(CpR_1R_2R_3R_4R_5)TiX_3 \qquad (I)$$

wherein the groups $R_1$, $R_2$, $R_3$, $R_4$ and $R_5$, the same or different, represent a hydrogen atom or $C_1$–$C_{10}$ alkyl groups;

Cp is a cyclopentadienyl group;

X represents a hydrogen atom, a halogen, a $C_1$–$C_{10}$ alkyl or oxyalkyl radical or a $C_6$–$C_{12}$ oxyaryl radical;

b) an alkylaluminoxane; and c) an organic derivative of tin;

characterized in that the alkylaluminoxane is methylaluminoxane treated at 20°–80° C. under vacuum for 1–100 hours and the organic derivative of tin is tin tetraphenyl.

12. The catalyst of claim 11, wherein X is a halogen.

* * * * *